(12) United States Patent
Tsuchikawa

(10) Patent No.: US 7,587,132 B2
(45) Date of Patent: Sep. 8, 2009

(54) DIGITAL VIDEO RECORDER TO BE CONNECTED TO A DIGITAL VIDEO CAMCORDER VIA IEEE 1394 SERIAL BUS

(75) Inventor: Tatsuyoshi Tsuchikawa, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 837 days.

(21) Appl. No.: 11/300,293

(22) Filed: Dec. 15, 2005

(65) Prior Publication Data

US 2006/0127058 A1 Jun. 15, 2006

(30) Foreign Application Priority Data

Dec. 15, 2004 (JP) ............................ 2004-362253

(51) Int. Cl.
*H04N 5/00* (2006.01)
*H04N 5/44* (2006.01)
*H04N 5/91* (2006.01)
*H04N 5/225* (2006.01)
*H04N 7/00* (2006.01)
*H04N 7/16* (2006.01)
*H04N 7/18* (2006.01)

(52) U.S. Cl. .......................... 386/117; 386/46; 386/83; 386/125; 348/158; 348/373; 348/376; 348/552; 348/734; 725/153

(58) Field of Classification Search ................ 386/117, 386/46, 83, 125, E5.002, E5.043, E5.069; 348/158, 373, 376, 552, 734, E5.103, E5.108; 375/E7.025; 725/153

See application file for complete search history.

(56) References Cited

U.S. PATENT DOCUMENTS

| | | | | |
|---|---|---|---|---|
| 6,400,280 | B1* | 6/2002 | Osakabe | 340/825.25 |
| 6,563,532 | B1* | 5/2003 | Strub et al. | 348/158 |
| 6,940,562 | B2* | 9/2005 | Sato | 348/734 |
| 7,292,770 | B2* | 11/2007 | Nakano et al. | 386/46 |

FOREIGN PATENT DOCUMENTS

JP 63-49624 4/1988

* cited by examiner

*Primary Examiner*—Thai Tran
*Assistant Examiner*—Syed Y Hasan
(74) *Attorney, Agent, or Firm*—Crowell & Moring LLP

(57) ABSTRACT

A digital video recorder connected to a DV camcorder sends, to the camcorder upon detecting camcorder mode change from a reproduction mode to a rewind mode, a stop command to forward a DV tape toward its end until a newest time code coincides with a time code at a reproduction end position. Thereafter, upon completion of the tape forwarding, and upon camcorder mode change from a reproduction mode to a stop mode, the recorder sends a reproduction command to, and receives a response from, the camcorder, and determines, based on the response, result of the reproduction by the reproduction command. If the recorder determines the result as successful, it determines reproduction of the tape to be interrupted, while if it determines the result as failing, it determines dubbing of DV stream from the tape to be completed. This prevents omission of dubbing of DV stream from the tape without fail.

7 Claims, 4 Drawing Sheets

RECORDING RESUMPTION DETERMINATION SCREEN 50

DIGITAL VIDEO RECORDER TO BE CONNECTED TO A DIGITAL VIDEO CAMCORDER VIA IEEE 1394 SERIAL BUS

BACKGROUND OF THE INVENTION

1. Field of the Invention

The present invention relates to a digital video recorder, such as an HDD (Hard Disk Drive) recorder, a DVD (Digital Versatile Disc) recorder or a digital VCR (Video Cassette Recorder), which is to be connected to a DV (Digital Video) camcorder via an IEEE (Institute of Electrical & Electronics Engineers) 1394 serial bus, and which is capable of recording DV stream sent from the DV camcorder.

2. Description of the Related Art

In a system of a digital video recorder, such as an HDD recorder, and a DV camcorder connected to the digital video recorder via an IEEE 1394 serial bus, assume that DV stream contained in a DV tape of the DV camcorder from an arbitrary position of the DV tape to an end position of the DV tape (end of recordable area of the DV tape) is dubbed (recorded) onto a recording medium of the digital video recorder. Generally, when the DV camcorder completes reproduction for the dubbing up to the end position of the DV tape, the mode of the DV camcorder is changed from a reproduction mode to a stop mode. When the mode of the DV camcorder is changed from the reproduction mode to the stop mode, the digital video recorder determines that the reproduction to the end position of the DV tape has been completed, thereby ending the dubbing.

However, if the DV camcorder is stopped not because the DV tape has been reproduced to the end of the DV tape, but because e.g. the reproduction of the DV tape is interrupted, a user is required to additionally dub DV stream recorded on the DV tape from the stop position of the DV tape (reproduction position at the time of the stop) to the end position of the DV tape. Thus, if the mode of the DV camcorder is changed from the reproduction mode to the stop mode, and if the mode change is caused because the reproduction of the DV tape is interrupted, the digital video recorder is required to notify the user to that effect so as to recommend that the user additionally dubs the DV stream recorded on the DV tape from the stop position of the DV tape. Furthermore, even if the mode change to the stop mode is caused because the DV tape has been reproduced to the end of the DV tape, it is desirable to notify the user that the dubbing of the DV stream from the DV tape has been completed.

A conventional digital video recorder of this kind is designed to achieve this object in the following manner. If the mode of a DV camcorder is changed from a reproduction mode to a stop mode, the digital video recorder sends a reproduction command to the DV camcorder to determine whether the DV camcorder succeeds or fails reproduction of its DV tape in response to the reproduction command. If it succeeds, the digital video recorder determines that the reproduction of the DV tape is interrupted, and notifies a user to that effect, while if it fails, the digital video recorder determines that the dubbing of DV stream from the DV tape has been completed, and notifies the user to that effect.

However, there is still a problem depending on the kind of DV camcorders. More specifically, the above-described conventional digital video recorder is not adapted to a DV camcorder which automatically changes its mode from a reproduction mode to a rewind mode when reproduction of a DV tape of the DV camcorder is completed to the end position of the DV tape. This is because, when the mode of the DV camcorder is changed from the reproduction mode to the rewind mode, the conventional digital video recorder cannot determine a cause of the mode change whether a user has commanded the DV camcorder to stop (interrupt) the reproduction and rewind the DV tape, or whether the DV camcorder has automatically rewound the DV tape after the dubbing of the DV stream from the DV tape is completed. Accordingly, the conventional digital video recorder cannot notify the user whether the reproduction of the DV tape is interrupted, or the dubbing of the DV stream from the DV tape is completed.

SUMMARY OF THE INVENTION

An object of the present invention is to provide such a digital video recorder to be connected to a DV camcorder via an IEEE 1394 serial bus that can notify a user whether reproduction of a DV tape of the DV camcorder is interrupted, or dubbing of DV stream from the DV tape is completed, regardless of the kind of DV camcorder (not only the kind that changes its mode from a reproduction mode to a stop mode when the reproduction of the DV tape is completed to the end position of the DV tape, but also the kind that changes its mode from a reproduction mode to a rewind mode when the reproduction of the DV tape is completed to the end position of the DV tape), so as to prevent omission of dubbing of DV stream from the DV tape.

According to the present invention, we provide a digital video recorder to be connected to a DV (Digital Video) camcorder via an IEEE (Institute of Electrical & Electronics Engineers) 1394 serial bus, the digital video recorder comprising: a time code acquisition means for acquiring time codes contained in DV stream recorded on a DV tape of, and sent from, the DV camcorder; a DV camcorder mode detection means for detecting a mode of the DV camcorder after dubbing of the DV stream from the DV tape is started; a reproduction end position time code storage means for storing a time code at a reproduction end position which the time code acquisition means acquires when the DV camcorder mode detection means detects that the mode of the DV camcorder is changed from a reproduction mode to a rewind mode; a stop command sending means for sending a stop command to the DV camcorder when the DV camcorder detection means detects that the mode of the DV camcorder is changed from a reproduction mode to a rewind mode; a tape forward control means for controlling the DV camcorder to forward the DV tape toward an EOT (end-of-tape) of the DV tape until a newest time code, which the time code acquisition means acquires from the DV camcorder, coincides with the time code at the reproduction end position, when rewinding of the DV tape in the DV camcorder is stopped by the stop command sent to the DV camcorder; a reproduction result determination means for sending a reproduction command to the DV camcorder so as to receive a response from the DV camcorder indicating a result of the reproduction command, and for determining the result of the reproduction command based on the response received from the DV camcorder, when the tape forward control means completes the tape forwarding of the DV tape, and when the DV camcorder mode detection means detects that the mode of the DV camcorder is changed from a reproduction mode to a stop mode; and a dubbing interrupt/completion determination means for determining that the reproduction of the DV tape is interrupted when the reproduction result determination means determines that the reproduction command succeeds in commanding the reproduction of the DV tape, and for determining that the dubbing of the DV stream from the DV tape is completed when the reproduction result determination means determines that the reproduction command fails in commanding the reproduction of the DV tape.

According to the present invention, when the digital video recorder determines that the mode of the DV camcorder is changed from a reproduction mode to a rewind mode, the digital video recorder controls the DV camcorder to stop and forward the DV tape to a reproduction end position, and determines whether reproduction of the DV tape is interrupted, or dubbing of DV stream from the DV tape is completed. This makes it possible to accurately determine, and notify a user, whether reproduction of a DV tape of the DV camcorder is interrupted, or dubbing of DV stream from the DV tape is completed, when the mode of the DV camcorder is changed from a reproduction mode to a stop mode or a rewind mode, thereby preventing omission of dubbing of DV stream from the DV tape without fail. This is regardless of the kind of DV camcorder, not only the kind that changes its mode from a reproduction mode to a stop mode when the reproduction of the DV tape is completed to the end position of the DV tape, but also the kind that changes its mode from a reproduction mode to a rewind mode when the reproduction of the DV tape is completed to the end position of the DV tape.

Preferably, the digital video recorder further comprises a notification means for notifying a user of a result of the determination which the dubbing interrupt/completion determination means makes.

Further preferably, the digital video recorder further comprises: a recording pause means for pausing recording of the DV stream from the DV tape when the DV camcorder mode detection means detects that the mode of the DV camcorder is changed from a reproduction mode to a stop mode, and when the DV camcorder mode detection means detects that the mode of the DV camcorder is changed from a reproduction mode to a rewind mode; a user determination means for the user to determine whether or not to resume the recording of DV stream from the DV tape when the dubbing interrupt/completion determination means determines that the reproduction of the DV tape is interrupted; and a recording pause release means for releasing the pause of the recording of the DV stream when the user determines to command resumption of the recording, using the user determination means.

Furthermore, the digital video recorder can be a hard disk recorder.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Embodiments of the present invention, as best modes for carrying out the invention, will be described hereinafter with reference to the drawings. The present invention relates to a digital video recorder to be connected to a DV (Digital Video) camcorder via an IEEE 1394 serial bus. The following embodiments describe examples in which the present invention is applied to an HDD (Hard Disk Drive) recorder. It is to be understood that the embodiments described herein are not intended as limiting, or encompassing the entire scope of, the invention.

Figure 1:
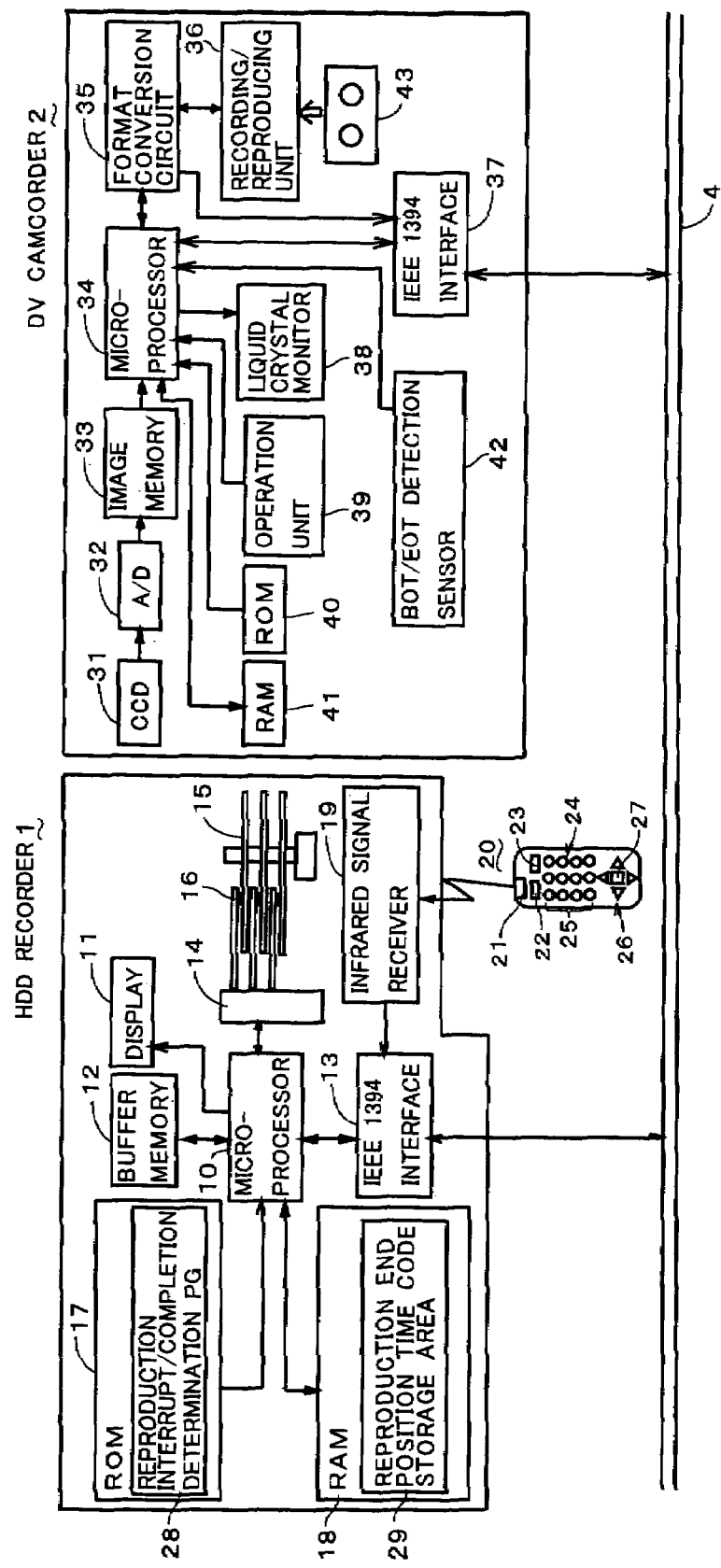
FIG. 1 is a schematic electrical block diagram of an HDD recorder according to a first and a second embodiment of the present invention as well as a DV camcorder to be connected to the HDD recorder via an IEEE 1394 serial bus.

FIG. 1 shows a schematic electrical block diagram of an HDD recorder 1 according to a first and a second embodiment of the present invention as well as a DV camcorder 2 to be connected to the HDD recorder 1 via an IEEE 1394 serial bus 4. The HDD recorder 1 is connected to the DV camcorder 2 via the IEEE 1394 serial bus 4 (hereafter referred to simply as "bus"), and is capable of recording, on hard disks 15, stream data received from the DV camcorder 2. The HDD recorder 1 comprises a microprocessor 10 which serves as a control means in a broad sense for controlling various elements and units therein, and more specifically as a "time code acquisition means", a "DV camcorder mode detection means" (with interface 13), a "reproduction result determination means", a "dubbing interrupt/completion determination means", a "notification means", a "stop command sending means" (with interface 13), a "tape forward control means", a "recording pause means", and a "recording pause release means", as will be apparent from later descriptions.

The HDD recorder 1 further comprises: a display 11 for displaying various menus and screens for determination or confirmation; a ROM (Read Only Memory) 17 storing control programs of the microprocessor 10; a RAM (Random Access Memory) 18 ("reproduction end position time code storage means") for storing various data; and an IEEE 1394 interface 13 (hereafter referred to simply as "interface", and serving as a "DV camcorder mode detection means" and a "stop command sending means" each with the microprocessor 10) for sending and receiving data, such as control commands and stream data, to and from an external input/output device such as the DV camcorder 2 via the bus 4. The control programs stored in the ROM 17 include a reproduction interrupt/completion determination PG (program) 28 composed of command codes describing a process of determining whether reproduction of a DV tape 43 is interrupted, or dubbing from the DV tape 43 is completed. Further, the RAM 18 has a reproduction end position time code storage area 29 for storing a time code at a reproduction end position. Such time code here is a kind of working data generated by the reproduction interrupt/completion determination PG 28.

The HDD recorder 1 further comprises: multiple hard disks 15 as a recording medium; multiple magnetic heads 16 for recording and reading (reproducing) data on and from the hard disks 15; a head drive unit 14 for driving the magnetic heads 16; and a buffer memory 12 for temporarily storing recorded data or read (reproduced) data. Furthermore, the HDD recorder 1 comprises an infrared signal receiver 19 for receiving an infrared signal sent from a remote control 20. The remote control 20, which a user uses to send commands to the HDD recorder 1, has an infrared signal sending unit 21 and a key unit 24 having various keys. The keys of the key unit 24 include a power supply key 23, numeric input keys 25, cursor keys 26, a decision key 27, and additionally, a menu key 22 to command the microprocessor 10 to display various menus on the display 11.

On the; other hand, the DV camcorder 2 is a DV camera with a built-in VCR (Video Cassette Recorder), and comprises: an IEEE 1394 interface 37 (hereafter referred to simply as "interface") for sending and receiving control commands and stream data to and from e.g. the HDD recorder 1 via the bus 4; a CCD (Charge Coupled Device) 31 for outputting a recorded image in the form of analog signal; an A/D (Analog-to-Digital) converter 32 for converting an analog signal output from the CCD 31 to a digital signal; an image memory 33 for temporarily storing image data sent from the A/D converter 32; a microprocessor 34 for subjecting the image data stored in the image memory 33 to various image processing; a format conversion circuit 35; and a recording/reproducing unit 36. The format conversion circuit 35 converts, into a DV stream, the format of the image data subjected to the image processing by the microprocessor 34. The recording/reproducing unit 36 writes or records, onto the DV tape 43, DV stream output from the format conversion circuit 35, and reproduces DV stream recorded on the DV tape 43, and so on. The DV camcorder 2 further comprises: a liquid crystal monitor 38 for displaying images sent from the microprocessor 34; an operation unit 39; a ROM 40 for storing various data such as control programs; a RAM 41 for storing various data such as working data; and a BOT (beginning-of-tape)/EOT (end-of-tape) detection sensor 42 for detecting beginning and end of the DV tape 43.

Figure 2:
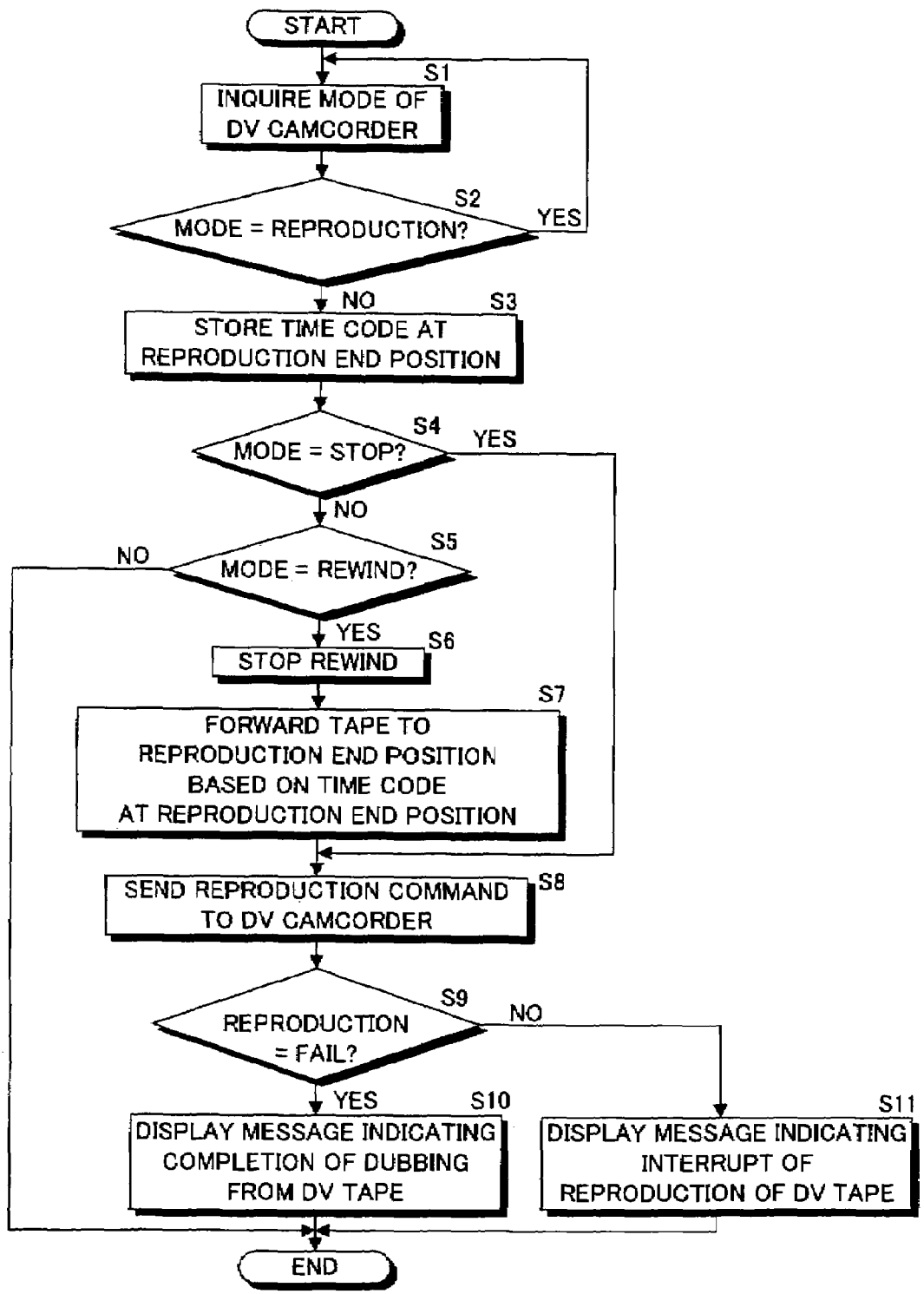
FIG. 2 is a flow chart showing a dubbing interrupt/completion determination process which the HDD recorder of the first embodiment of the present invention performs when dubbing DV stream from a DV tape, so as to determine whether reproduction of the DV tape has been interrupted, or dubbing from the DV tape has been completed.

Referring now to the flow chart of FIG. 2, the following describes a dubbing interrupt/completion determination process which the HDD recorder 1 of the first embodiment of the present invention performs when dubbing DV stream from the DV tape 43 set in the DV camcorder 2, so as to determine whether reproduction of the DV tape 43 has been interrupted, or dubbing from the DV tape 43 has been completed. This dubbing interrupt/completion determination process describes a process performed by the reproduction interrupt/completion determination PG 28 shown in FIG. 1. The difference between the first embodiment and the second embodiment described later is in the process and the way that the HDD recorder 1 performs. When a user, using the remote control 20, commands start of dubbing of DV stream from the DV tape 43 to the hard disks 15, the microprocessor 10 of the HDD recorder 1 acquires time codes from the DV stream sent from the DV camcorder 2, and sends, to the DV camcorder 2, a mode inquiry command for inquiring the mode of the DV camcorder 2 (S1). Based on content of response sent back from the DV camcorder 2, the microprocessor 10 detects the mode of the DV camcorder 2 (S2).

When the microprocessor 10 detects that the mode of the DV camcorder 2 is changed from a reproduction mode to a further mode (NO in S2), the microprocessor 10 acquires a time code in the DV stream immediately preceding the mode change from the reproduction mode to the further mode (namely, a time code at a reproduction end position of the DV stream) as a reproduction end position time code, and stores the reproduction end position time code in the reproduction end position time code storage area 29 of the RAM 18 (S3).

Note here that the term "position" of the DV stream is used in the present specification to mean a position of the DV stream on the DV tape 43 at which a magnetic head 16 is positioned, so that the "reproduction end position" means a position of the DV stream on the DV tape at which a magnetic head 16 is positioned when the reproduction ends. Furthermore, the "reproduction end position time code" means a time code in the DV stream at the "reproduction end position".

Next, when the microprocessor 10 of the HDD recorder 1 detects, based on the mode inquiry in the above-described step S1, that the mode of the DV camcorder 2 is changed to a rewind mode (NO in S4 and YES in S5), the microprocessor 10 sends a stop command to the DV camcorder 2 to stop the rewind (S6), and continues to acquire time codes from the DV camcorder 2. When the rewinding of the DV tape 43 in the DV camcorder 2 is stopped by the stop command sent to the DV camcorder 2, the microprocessor 10 controls the DV camcorder 2 to forward the DV tape 43 toward the EOT of the DV stream (DV tape. 43) until a newest time code, which the microprocessor 10 acquires from the DV camcorder 2, coincides with the reproduction end position time code stored in the reproduction end position time code storage area 29 of the RAM 18. In other words, the microprocessor 10 forwards the DV tape 43 to the reproduction end position of the DV stream (S7).

When the tape forwarding process in the step S7 is completed, the microprocessor 10 of the HDD recorder 1 sends a reproduction command to the DV camcorder 2 to reproduce DV stream on the DV tape 43 (S8), so as to receive a response from the DV camcorder indicating a result of the reproduction command, and further determines the result of the reproduction command based on the response received from the DV camcorder 2 (S9). The microprocessor 10 performs these steps S8 and S9 also when the microprocessor 10 detects, as a result of the mode inquiry in the step S1, that the mode of the DV camcorder 2 is changed to a stop mode (YES in S4).

If the determination in the step S9 indicates (namely, if the microprocessor 10 determines) that the reproduction command fails in commanding the reproduction (YES in S9), the microprocessor 10 of the HDD recorder 1 determines that the dubbing of DV stream from the DV tape 43 has been completed, and displays a message to that effect on the display 11 (S10). On the other hand, if the determination in the step S9 indicates (namely, if the microprocessor 10 determines) that the reproduction command succeeds in commanding the reproduction (NO in S9), the microprocessor 10 determines that the reproduction of DV stream from the DV tape 43 in the DV camcorder 2 has been interrupted, and displays a message to that effect on the display 11 (S11).

As described in the foregoing, the HDD recorder 1 according to the first embodiment of the present invention is designed so that, when the HDD recorder 1 (microprocessor 10) detects the mode change of the DV camcorder 2 from the reproduction mode to the rewind mode, the HDD recorder 1 (microprocessor 10) rewinds the DV tape 43 to the reproduction end position, and then determines whether the reproduction of the DV tape 43 has been interrupted, or the dubbing of DV stream from the DV tape 43 has been completed. Thus, the HDD recorder 1 of the first embodiment can make the determination of interrupt/completion of dubbing, regardless of the kind of DV camcorder 2, not only the kind that changes its mode from a reproduction mode to a stop mode when the reproduction of the DV tape 43 is completed to the end position of the DV tape 43, but also the kind that changes its mode from a reproduction mode to a rewind mode when the reproduction of the DV tape 43 is completed to the end position of the DV tape 43.

For either kind of DV camcorders 2, the HDD recorder 1 (microprocessor 10) can accurately determine whether the reproduction of the DV tape 43 has been interrupted, or the dubbing of DV stream from the DV tape 43 has been completed, when the mode of the DV camcorder 2 is changed from the reproduction mode to either the stop mode or the rewind mode. Further, the HDD recorder 1 can notify a user of the result of the determination. Thus, the HDD recorder 1 can prevent omission of dubbing of DV stream from the DV tape 43 without fail.

Figure 3:
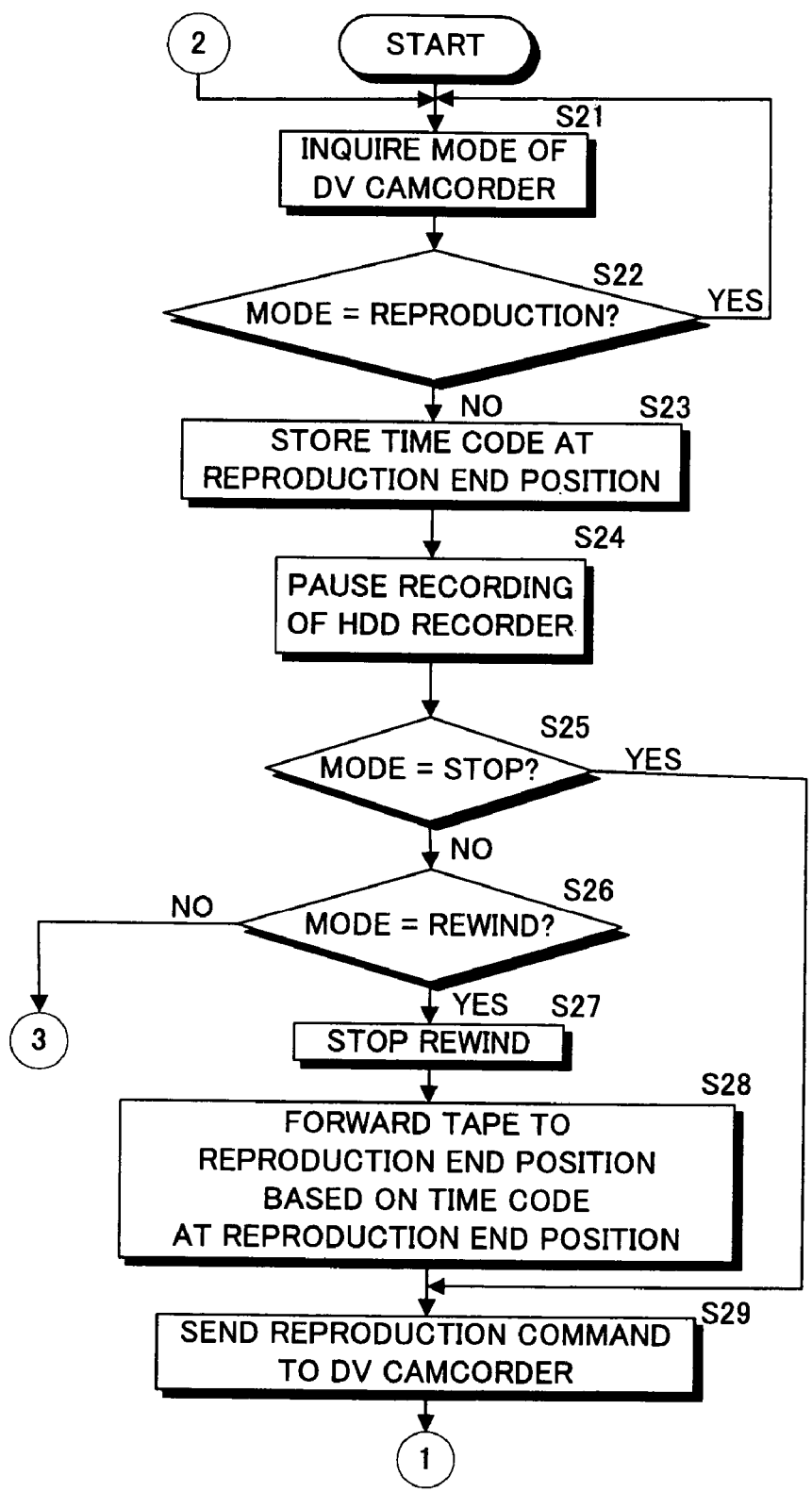
FIG. 3 is an upper half of, and FIG. 4 is a lower half of, a flow chart showing a dubbing interrupt/completion determination process which the HDD recorder of the second embodiment of the present invention performs when dubbing DV stream from a DV tape, so as to determine whether reproduction of the DV tape has been interrupted, or dubbing from the DV tape has been completed.
Figure 4:
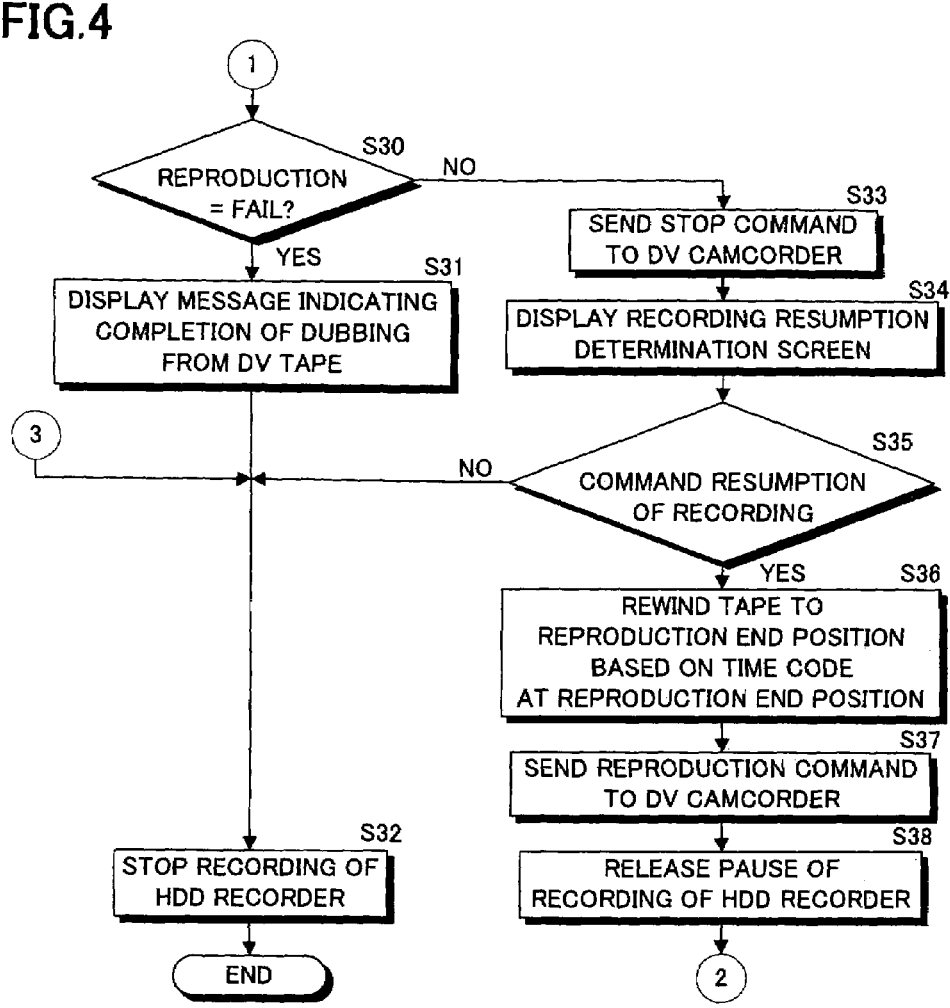

Hereinafter, an HDD recorder 1 according to a second embodiment of the present invention will be described with reference to the flow chart of FIG. 3 and FIG. 4, in which FIG. 3 is its upper half, and FIG. 4 is its lower half. Referring to FIG. 3 and FIG. 4, the following describes a dubbing interrupt/completion determination process which the HDD recorder 1 according to the second embodiment of the present invention performs when dubbing DV stream from the DV tape 43 set in the DV camcorder 2, so as to determine whether reproduction of the DV tape 43 has been interrupted, or dubbing from the DV tape 43 has been completed. Similarly as in the first embodiment, this dubbing interrupt/completion determination process of the second embodiment describes a process performed by the reproduction interrupt/completion determination PG 28 shown in FIG. 1. When a user, using the remote control 20, commands start of dubbing of DV stream from the DV tape 43 to the hard disks 15, the microprocessor 10 of the HDD recorder 1 acquires time codes from the DV stream sent from the DV camcorder 2, and sends, to the DV camcorder 2, a mode inquiry command for inquiring the mode of the DV camcorder 2 (S21). Based on content of response sent back from the DV camcorder 2, the microprocessor 10 detects the mode of the DV camcorder 2 (S22).

When the microprocessor 10 detects that the mode of the DV camcorder 2 is changed from a reproduction mode to a further mode (NO in S22), the microprocessor 10 acquires a time code in the DV stream immediately preceding the mode change from the reproduction mode to the further mode (namely, a time code at a reproduction end position of the DV stream) as a reproduction end position time code, and stores the reproduction end position time code in the reproduction end position time code storage area 29 of the RAM 18 (S23). Then, the microprocessor 10 pauses operation of the HDD recorder 1 of recording (dubbing) DV stream sent from the DV camcorder 2 (S24).

Next, when the microprocessor 10 of the HDD recorder 1 detects, based on the mode inquiry in the above-described step S21, that the mode of the DV camcorder 2 is changed to a rewind mode (NO in S25 and YES in S26), the microprocessor 10 sends a stop command to the DV camcorder 2 to stop the rewind (S27), and continues to acquire time codes from the DV camcorder 2. When the rewinding of the DV tape 43 in the DV camcorder 2 is stopped by the stop command sent to the DV camcorder 2, the microprocessor 10 controls the DV camcorder 2 to forward the DV tape 43 toward the EOT of the DV stream (DV tape 43) until a newest time code, which the microprocessor 10 acquires from the DV camcorder 2, coincides with the reproduction end position time code stored in the reproduction end position time code storage area 29 of the RAM 18. In other words, the microprocessor 10 forwards the DV tape 43 to the reproduction end position of the DV stream (S28).

When the tape forwarding process in the step S28 is completed, the microprocessor 10 of the HDD recorder 1 sends a reproduction command to the DV camcorder 2 to reproduce DV stream on the DV tape 43 (S29), so as to receive a response from the DV camcorder 2 indicating a result of the reproduction command, and further determines the result of the reproduction command based on the response received from the DV camcorder 2 (S30). The microprocessor 10 performs these steps S29 and S30 also when the microprocessor 10 detects, as a result of the mode inquiry in the step S21, that the mode of the DV camcorder 2 is changed to a stop mode (YES in S25).

Figure 5:
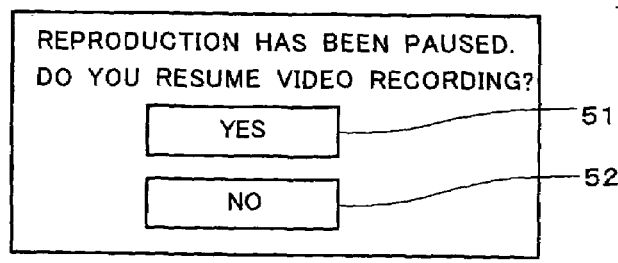
FIG. 5 is a view showing a recording resumption determination screen displayed on a display of the HDD recorder according to the second embodiment of the present invention.

If the determination in the step S30 indicates (namely, if the microprocessor 10 determines) that the reproduction command fails in commanding the reproduction (YES in S30), the microprocessor 10 of the HDD recorder 1 determines that the dubbing of DV stream from the DV tape 43 has been completed, and displays a message to that effect on the display 11 (S31), and completely stops the recording (dubbing) operation (S32). On the other hand, if the determination in the step S30 indicates (namely, if the microprocessor 10 determines) that the reproduction command succeeds in commanding the reproduction (NO in S30), the microprocessor 10 sends a stop command to the DV camcorder 2 to stop the reproduction operation based on the reproduction command (S33). At the same time, the microprocessor 10 determines that the dubbing or reproduction of DV stream from the DV tape 43 has been interrupted, and displays, on the display 11, a recording resumption determination screen 50 ("user determination means") (refer to FIG. 5), to be used by the user, for the user to determine whether or not to resume the operation of recording DV stream from the DV tape 43 (S34).

If the user operates the remote control 20 to select a "YES" button 51 on the recording resumption determination screen 50 to command resumption of the recording operation (YES in S35), the microprocessor 10 of the HDD recorder 1 controls the DV camcorder 2 to rewind the DV tape 43 toward the BOT of the DV stream (DV tape 43), while the microprocessor 10 continues to acquire time codes from the DV camcorder 2 until a newest time code, which the microprocessor 10 acquires from the DV camcorder 2, coincides with the reproduction end position time code stored in the reproduction end position time code storage area 29 of the RAM 18 (S36). Thereafter, the microprocessor 10 sends a reproduction command to the DV camcorder 2 (S37), and releases the pause of the recording operation as paused in the step S24 (S38) so as to resume recording of DV stream sent from the DV camcorder 2. On the other hand, if the user operates the remote control 20 to select a "NO" button 52 on the recording resumption determination screen 50 to command stop of the recording operation (NO in S35), the microprocessor 10 of the HDD recorder 1 completely stops the recording operation (S32).

As described in the foregoing, the HDD recorder 1 according to the second embodiment of the present invention is designed so that, when the HDD recorder 1 (microprocessor 10) determines that reproduction of the DV tape 43 (hence recording in the HDD recorder 1) is interrupted, the HDD recorder 1 (microprocessor 10) allows a user to determine whether to resume the operation of recording DV stream from the DV tape 43. If the user determines and commands resumption of the recording operation, the HDD recorder 1 (microprocessor 10) releases the pause of the recording operation, and resumes recording of DV stream on the DV tape 43 from the reproduction end position. Thus, the HDD recorder 1 of the second embodiment can make the determination of interrupt/completion of dubbing, regardless of the kind of DV camcorder 2, and can prevent omission of dubbing of DV stream from the DV tape 43 without fail.

It is to be noted that the present invention is not limited to the above-described embodiments, and various modifications are possible. For example, the above-described embodiments show the case in which the present invention has been applied to an HDD recorder. However, the digital video recorder to which the present invention can be applied is not limited thereto. The digital video recorder can be e.g. a DVD recorder or a digital VCR. In addition, although the HDD recorder each of the above-described embodiments is designed to display a message in each of the case where reproduction of the DV tape is interrupted, and the case where dubbing of DV stream from the DV tape is completed, it is possible to display a message only in the former case.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

This application is based on Japanese patent application 2004-362253 filed Dec. 15, 2004, the contents of which are hereby incorporated by reference.

What is claimed is:

1. A digital video recorder to be connected to a DV (Digital Video) camcorder via an IEEE (Institute of Electrical & Electronics Engineers) 1394 serial bus, the digital video recorder comprising:
   a time code acquisition means for acquiring time codes contained in DV stream recorded on a DV tape of, and sent from, the DV camcorder;
   a DV camcorder mode detection means for detecting a mode of the DV camcorder after dubbing of the DV stream from the DV tape is started;
   a reproduction end position time code storage means for storing a time code at a reproduction end position which the time code acquisition means acquires when the DV camcorder mode detection means detects that the mode of the DV camcorder is changed from a reproduction mode to a rewind mode;
   a stop command sending means for sending a stop command to the DV camcorder when the DV camcorder detection means detects that the mode of the DV camcorder is changed from a reproduction mode to a rewind mode;
   a tape forward control means for controlling the DV camcorder to forward the DV tape toward an EOT (end-of-tape) of the DV tape until a newest time code, which the time code acquisition means acquires from the DV camcorder, coincides with the time code at the reproduction end position, when rewinding of the DV tape in the DV camcorder is stopped by the stop command sent to the DV camcorder;
   a reproduction result determination means for sending a reproduction command to the DV camcorder so as to receive a response from the DV camcorder indicating a result of the reproduction command, and for determining the result of the reproduction command based on the response received from the DV camcorder, when the tape forward control means completes the tape forwarding of the DV tape, and when the DV camcorder mode detection means detects that the mode of the DV camcorder is changed from a reproduction mode to a stop mode; and
   a dubbing interrupt/completion determination means for determining that the reproduction of the DV tape is interrupted when the reproduction result determination means determines that the reproduction command succeeds in commanding the reproduction of the DV tape, and for determining that the dubbing of the DV stream from the DV tape is completed when the reproduction result determination means determines that the reproduction command fails in commanding the reproduction of the DV tape.

2. The digital video recorder according to claim 1, which further comprises a notification means for notifying a user of a result of the determination which the dubbing interrupt/completion determination means makes.

3. The digital video recorder according to claim 2, which further comprises:
   a recording pause means for pausing recording of the DV stream from the DV tape when the DV camcorder mode detection means detects that the mode of the DV camcorder is changed from a reproduction mode to a stop mode, and when the DV camcorder mode detection means detects that the mode of the DV camcorder is changed from a reproduction mode to a rewind mode;
   a user determination means for the user to determine whether or not to resume the recording of DV stream from the DV tape when the dubbing interrupt/completion determination means determines that the reproduction of the DV tape is interrupted; and
   a recording pause release means for releasing the pause of the recording of the DV stream when the user determines to command resumption of the recording, using the user determination means.

4. The digital video recorder according to claim 3, wherein the digital video recorder is a hard disk recorder.

5. The digital video recorder according to claim 2, wherein the digital video recorder is a hard disk recorder.

6. The digital video recorder according to claim 1, wherein the digital video recorder is a hard disk recorder.

7. The digital video recorder according to claim 1, which further comprises:
   a recording pause means for pausing recording of the DV stream from the DV tape when the DV camcorder mode detection means detects that the mode of the DV camcorder is changed from a reproduction mode to a stop mode, and when the DV camcorder mode detection means detects that the mode of the DV camcorder is changed from a reproduction mode to a rewind mode;
   a user determination means for the user to determine whether or not to resume the recording of DV stream from the DV tape when the dubbing interrupt/completion determination means determines that the reproduction of the DV tape is interrupted; and
   a recording pause release means for releasing the pause of the recording of the DV stream when the user determines to command resumption of the recording, using the user determination means.

* * * * *